United States Patent
Koishi

(10) Patent No.: US 12,166,978 B2
(45) Date of Patent: *Dec. 10, 2024

(54) COMMUNICATION CONTROL SYSTEM AND COMMUNICATION CONTROL METHOD

(71) Applicant: NEC Corporation, Tokyo (JP)

(72) Inventor: Takahiro Koishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 18/008,772

(22) PCT Filed: Jun. 8, 2021

(86) PCT No.: PCT/JP2021/021719
§ 371 (c)(1),
(2) Date: Dec. 7, 2022

(87) PCT Pub. No.: WO2021/251370
PCT Pub. Date: Dec. 16, 2021

(65) Prior Publication Data
US 2023/0254482 A1 Aug. 10, 2023

(30) Foreign Application Priority Data
Jun. 9, 2020 (JP) ................................ 2020-100139

(51) Int. Cl.
*H04N 7/12* (2006.01)
*H04N 19/115* (2014.01)
*H04N 19/164* (2014.01)

(52) U.S. Cl.
CPC ......... *H04N 19/115* (2014.11); *H04N 19/164* (2014.11)

(58) Field of Classification Search
CPC .... H04N 19/115; H04N 19/164; H04N 19/85; H04L 47/24; H04L 47/25; H04L 65/40
See application file for complete search history.

(56) References Cited

U.S. PATENT DOCUMENTS

| | | | |
|---|---|---|---|
| 5,719,632 | A | 2/1998 | Hoang et al. |
| 6,204,932 | B1 | 3/2001 | Haneda et al. |

(Continued)

FOREIGN PATENT DOCUMENTS

| | | | |
|---|---|---|---|
| JP | S64-044680 | A | 2/1989 |
| JP | H06-209926 | A | 8/1994 |

(Continued)

OTHER PUBLICATIONS

International Search Report for PCT Application No. PCT/JP2021/021719, mailed on Aug. 31, 2021.

(Continued)

*Primary Examiner* — Gims S Philippe

(57) ABSTRACT

A communication control system is configured to transmit image frame data from a first communication device to a second communication device. The second communication device includes a reception buffer for receiving the image frame data from the first communication device and a reply unit for transmitting, to the first communication device, an ACK frame as a reply at a timing. The first communication device includes: an estimation unit configured to receive the ACK frame from the reply unit and estimating the remaining capacity of the reception buffer based on a reception time of the received ACK frame; an area specifying unit configured to specify an area in the image frame which is necessary for performing image inspection; and a modification unit configured to perform, based on the estimated remaining capacity of the reception buffer, image compression for the areas.

10 Claims, 10 Drawing Sheets

(56) References Cited

U.S. PATENT DOCUMENTS

| | | | |
|---|---|---|---|
| 10,805,402 B1* | 10/2020 | Whitman | H04W 12/104 |
| 2003/0043272 A1 | 3/2003 | Nagao et al. | |
| 2003/0156596 A1* | 8/2003 | Sumasu | H04W 80/00 370/310 |
| 2009/0046618 A1* | 2/2009 | Shiba | H04L 12/1886 370/312 |
| 2013/0058396 A1 | 3/2013 | Shimizu et al. | |
| 2015/0244760 A1 | 8/2015 | Tun et al. | |
| 2016/0261373 A1 | 9/2016 | Nagasaka et al. | |
| 2017/0264519 A1 | 9/2017 | Kanou | |
| 2018/0062792 A1* | 3/2018 | Sugaya | H04W 28/04 |
| 2018/0288650 A1 | 10/2018 | Suzuki et al. | |
| 2018/0332342 A1 | 11/2018 | Wu et al. | |
| 2019/0386768 A1* | 12/2019 | Shimoji | H04W 24/08 |
| 2020/0358551 A1* | 11/2020 | Kuratani | H04L 1/0026 |
| 2020/0366324 A1* | 11/2020 | Hong | H04B 17/318 |

FOREIGN PATENT DOCUMENTS

| | | |
|---|---|---|
| JP | H09-214962 A | 8/1997 |
| JP | 2000-347999 A | 12/2000 |
| JP | 2002-534864 A | 10/2002 |
| JP | 2005-128941 A | 5/2005 |
| JP | 2006-080832 A | 3/2006 |
| JP | 2008-301309 A | 12/2008 |
| JP | 2014-022970 A | 2/2014 |
| JP | 2017-163316 A | 9/2017 |
| JP | 2018-200680 A | 12/2018 |
| JP | 2019-114947 A | 7/2019 |
| WO | 2011/138900 A1 | 11/2011 |
| WO | 2015/052843 A1 | 4/2015 |
| WO | 2016/088582 A1 | 6/2016 |

OTHER PUBLICATIONS

US Notice of Allowance for U.S. Appl. No. 17/801,121, mailed on Mar. 20, 2024.

International Search Report for PCT Application No. PCT/JP2021/009512, mailed on May 18, 2021.

US Office Action for U.S. Appl. No. 17/801,128, mailed on Nov. 24, 2023.

International Search Report for PCT Application No. PCT/JP2021/009535, mailed on Jun. 1, 2021.

* cited by examiner

| BUFFER USAGE RATE (%) | TRANSMISSION DELAY TIME (ms) |
|---|---|
| 95 | T1 |
| 90 | T2 |
| 85 | T3 |
| 80 | T4 |
| 70 | T5 |
| ⋮ | ⋮ |
| 0 | Tn |

Fig. 7

| ESTIMATED REMAINING CAPACITY OF BUFFER (%) | COMPRESSION RATE |
|---|---|
| 95 | a |
| 90 | b |
| 85 | c |
| 80 | d |
| 70 | e |
| ⋮ | ⋮ |
| 0 | n |

Fig. 10

COMMUNICATION CONTROL SYSTEM AND COMMUNICATION CONTROL METHOD

This application is a National Stage Entry of PCT/JP2021/021719 filed on Jun. 8, 2021, which claims priority from Japanese Patent Application 2020-100139 filed on Jun. 9, 2020, the contents of all of which are incorporated herein by reference, in their entirety.

TECHNICAL FIELD

The present disclosure relates to a communication control system and a communication control method.

BACKGROUND ART

In a communication control system, image frame data is transmitted from a first communication device (transmitting side) to a second communication device (receiving side) and an ACK frame corresponding to the received image frame data is transmitted from the second communication device to the first communication device as a reply to the received image frame data. Each ACK frame is numbered so as to correspond to a received frame and transmitted to the transmitting side as a reply to the received frame. By this configuration, the transmitting side is able to know if reception has failed at the receiving side, and in some cases, it can perform re-transmission of the image frame data for which transmission has failed.

Patent Literature 1 discloses a data management server capable of analyzing image processing results and/or image data transmitted from a photographing apparatus, for example, through deep learning processing. Further, Patent Literature 2 discloses an image data amount reduction unit configured to calculate and extract (trim) a region, which is a suitable region for performing the recognition/authentication process by an image reception device from the selected image.

CITATION LIST

Patent Literature

Patent Literature 1: Japanese Unexamined Patent Application Publication No. 2018-200680
Patent Literature 2: Japanese Unexamined Patent Application Publication No. 2014-022970

SUMMARY OF INVENTION

Technical Problem

However, in a computer system like the one described above, proper image compression cannot be performed on the transmitting side based on the remaining capacity of the reception buffer.

An object of the present disclosure is to provide a communication control system and a communication control method that enable proper image compression to be performed by the transmitting side based on the remaining capacity of the reception buffer.

Solution to Problem

According to a first aspect of the present disclosure, a communication control system includes:

a first communication device; and
a second communication device, wherein
image frame data is transmitted from the first communication device to the second communication device,
the second communication device includes:
a reception buffer for receiving the image frame data from the first communication device; and
a reply unit configured to transmit an ACK frame to the first communication device at a timing when remaining capacity of the reception buffer of the second communication device is reflected,
the first communication device includes:
an estimation unit configured to receive the ACK frame from the reply means of the second communication device and estimating the remaining capacity of the reception buffer of the second communication device based on a reception time of the ACK frame;
an area specifying unit configured to specify an area in the image frame which is necessary for performing image inspection;
a modification unit configured to perform, based on the estimated remaining capacity of the reception buffer, image compression for the areas in the image frame other than the area in the image frame necessary for performing image inspection; and
a transmission unit configured to transmit image frame data from the first communication device to the second communication device.

According to a second aspect of the present disclosure, a communication control method for transmitting image frame data from a first communication device to a second communication device, includes:
performing, in the second communication device,
reception of image frame data from the first communication device, and
transmission of an ACK frame to the first communication device at a timing when remaining capacity of the reception buffer of the second communication device is reflected;
performing, in the first communication device,
reception of the ACK frame from the second communication device and estimation of the remaining capacity of the reception buffer of the second communication device based on a reception time of the ACK frame,
specification of an area in the image frame which is necessary for performing image inspection,
image compression based on the estimated remaining capacity of the reception buffer for the areas in the image frame other than the area in the image frame necessary for performing inspection, and
transmission of image frame data from the first communication device to the second communication device.

Advantageous Effects of Invention

According to the present disclosure, it is possible for the transmitting side to perform proper compression of image frame data based on the remaining capacity of a reception buffer, whereby it is possible to suppress overflow of the reception buffer.

BRIEF DESCRIPTION OF DRAWINGS

FIG. 7 is a table showing a transmission delay time based on the usage rate of the reception buffer;

FIG. 10 is a table showing estimated compression rates based on the estimated usage rates of the reception buffer.

EXAMPLE EMBODIMENT

First Example Embodiment

Hereinbelow, example embodiments of the present disclosure will be described with reference to the drawings.

Figure 1:
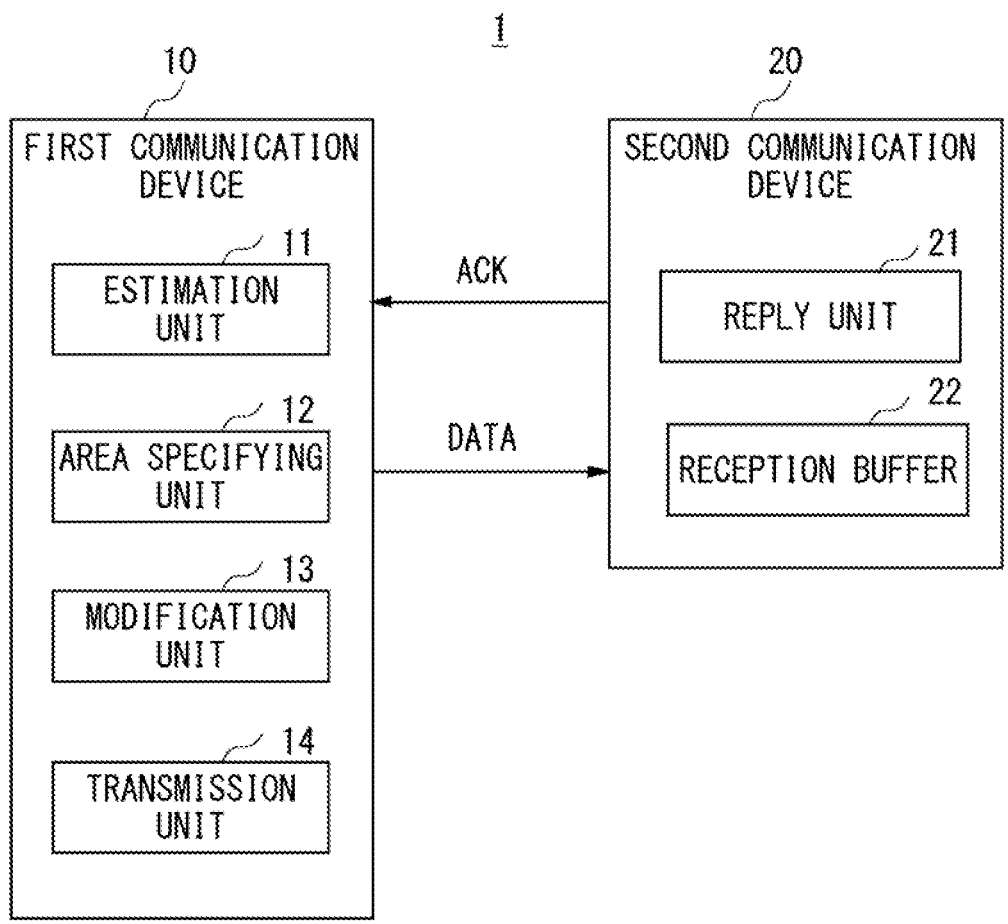
FIG. 1 is a block diagram showing a communication control system according to a first example embodiment.

FIG. 1 is a block diagram showing a configuration of a communication control system according to a first example embodiment.

A communication control system 1 includes a first communication device 10 and a second communication device 20 connected to the first communication device 10 through a network (including a wired network and a wireless network). When the first communication device 10 transmits image frame data to the second communication device 20, the second communication device 20 transmits the ACK frame to the first communication device 10 as a reply to the received image frame data.

The second communication device 20 includes a reception buffer 22 that receives image frame data from the first communication device 10 and a reply unit 21 that transmits an ACK frame to the first communication device 10 as a reply to the received image frame data at a timing when the remaining capacity (or the usage rate) of the reception buffer 22 is reflected.

The first communication device 10 includes an estimation unit 11, an area specifying unit 12, a modification unit 13, and a transmission unit 14. The estimation unit 11 receives an ACK frame from the reply unit 21 of the second communication device 20 and estimates the remaining capacity (or the usage rate) of the reception buffer 22 of the second communication device 20 from the reception time of the ACK frame. The area specifying unit 12 specifies one or more areas in the image frame necessary for performing inspection. The modification unit 13 performs image compression of the image frame based on the estimated remaining capacity (or the usage rate) of the reception buffer for the areas in the image frame other than the area in the image frame necessary for performing inspection. The transmission unit 14 transmits image frame data from the first communication device 10 to the second communication device 20.

Figure 2:
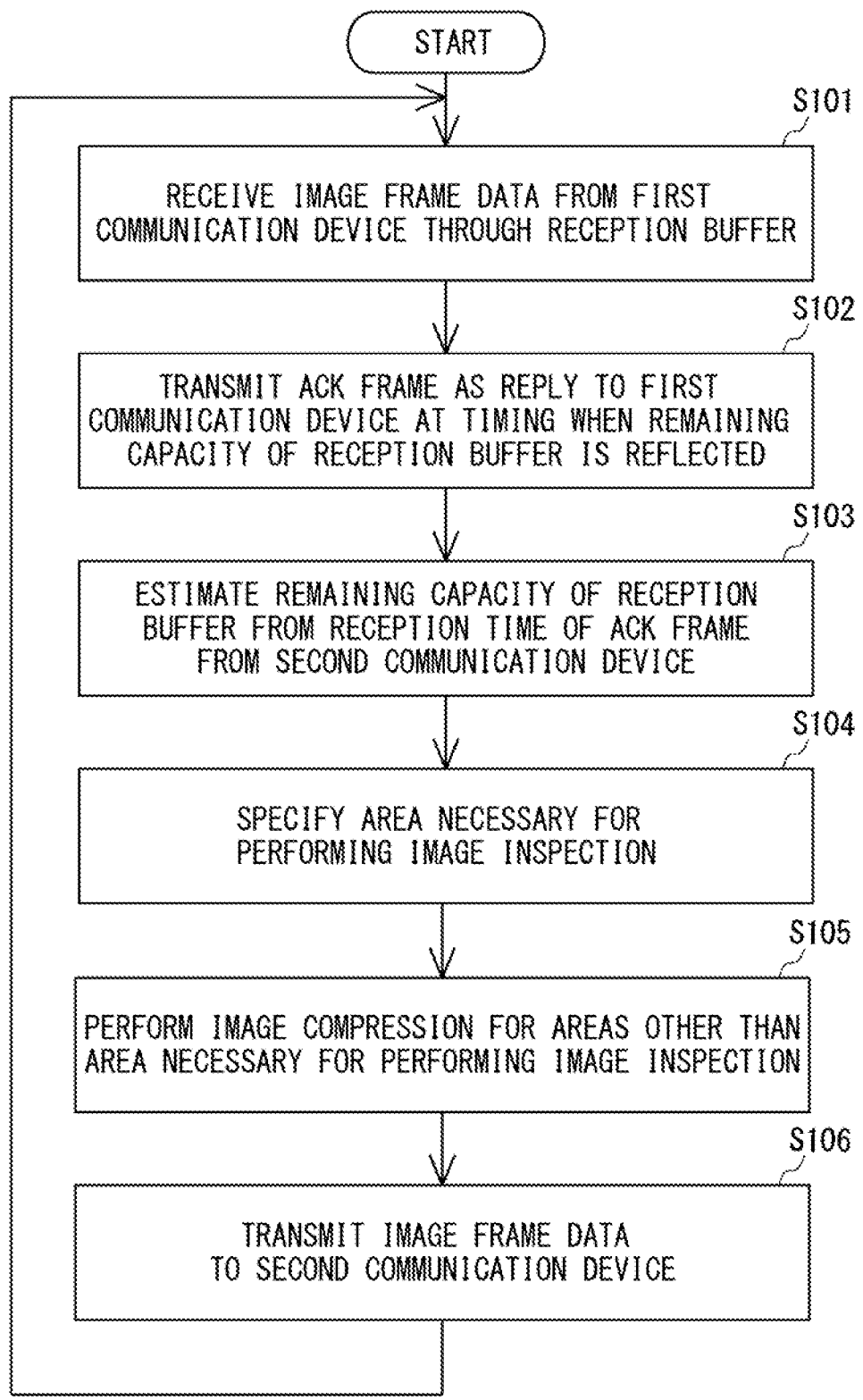
FIG. 2 is a flowchart showing a communication control method according to the first example embodiment.

FIG. 2 is a flowchart showing a communication control method according to the first example embodiment.

In the communication control system 1, image frame data is transmitted from the first communication device 10 to the second communication device 20 and an ACK frame is transmitted from the second communication device 20 to the first communication device 10 as a reply to the received image frame data. First, the second communication device 20 receives image frame data from the first communication device 10 through the reception buffer 22 (Step S101). The second communication device 20 transmits an ACK frame to the first communication device 10 as a reply to the received image data at an appropriate timing based on the remaining capacity (or the usage rate) of the reception buffer 22 (Step S102). For example, the ACK frame can be transmitted as a reply at a timing that is delayed as the remaining capacity of the reception buffer decreases (the usage rate of the reception buffer increases).

The first communication device 10 estimates the remaining capacity (or the usage rate) of the reception buffer from the reception time of the ACK frame transmitted from the second communication device 20 (Step S103). The area within the image frame necessary for performing inspection is specified (Step S104). The first communication device 10 performs image compression of the image frame based on the estimated remaining capacity (or the usage rate) of the reception buffer for the areas in the image frame other than the area in the image frame necessary for performing inspection (Step S105). The first communication device 10 transmits image frame data to the second communication device 20 (Step S106). Then, the processing returns to Step S101.

As described above, according to the communication control system according to the present example embodiment, it is possible to perform proper compression of the image frame data based on the remaining capacity (or the usage rate) of the reception buffer, whereby it is possible to suppress overflow of the reception buffer.

Second Example Embodiment

The present disclosure relates to an image inspection system of remotely transmitting an uncompressed (RAW) image taken with a camera and performing inspection using the photographed image. There are two main issues with a convention image inspection system. The first problem is that in a conventional image inspection system, image inspection operation is continued even when an image reception buffer overflows and the camera image data that has overflowed from the buffer is discarded.

The reasons therefor are as follows. Normally, an image inspection system is designed for continuous and fast inspection processing such as checking the products that are conveyed on a belt conveyor for their appearances and the like. Therefore even when the reception buffer is full of data, the image data for checking the subsequent products are sent one after the other. Therefore, data that cannot be stored in the buffer is discarded in order to continue the image inspection operation.

The second problem is that in the aforementioned image inspection system, in many cases, RAW images that have no information lacking are used.

The reason therefor is that in general, unprocessed RAW image is used as an evidence of image inspection, and when an error occurs in the result of image inspection, it needs to be checked using the unprocessed image in order to verify an error in the image inspection algorithm.

Figure 3:
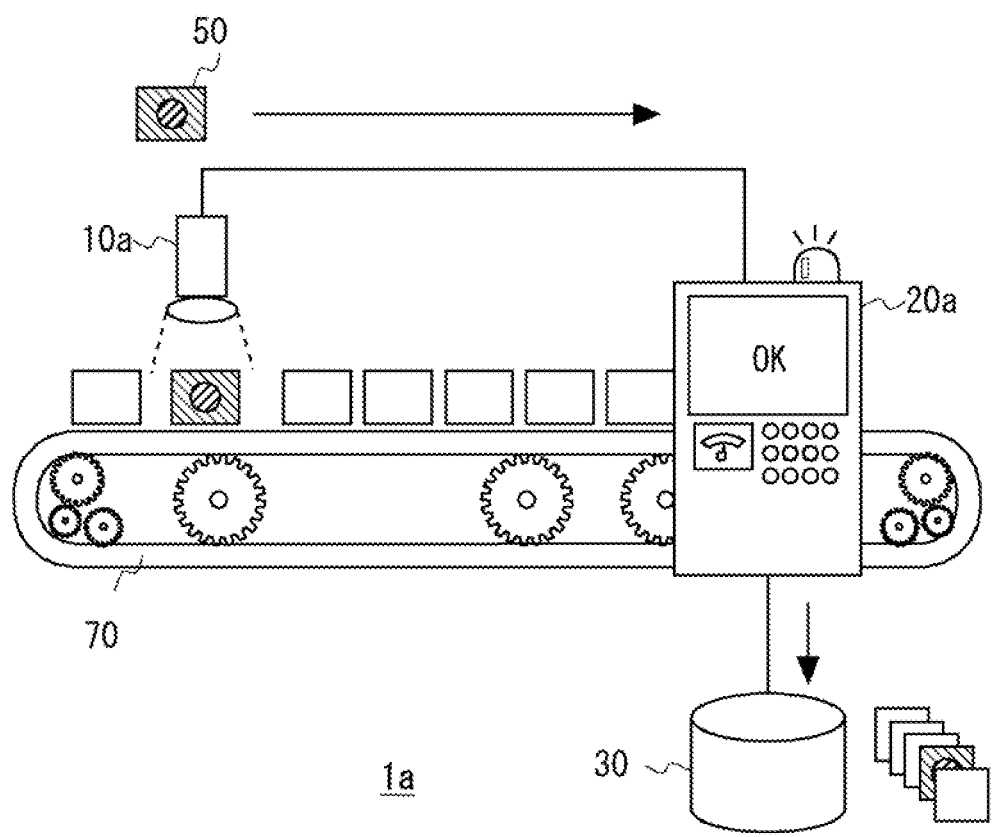
FIG. 3 is a schematic diagram showing a configuration of an image inspection system according to a second example embodiment.

FIG. 3 is a schematic diagram showing a configuration of an image inspection system according to a second example embodiment.

In an image inspection system 1a, an image photographing unit 10a provided with a camera takes photographs of products that are sequentially conveyed by a conveying device 70 such as a belt conveyor and sends the photographed image 50 to an image inspection unit 20a through a network. The image inspection unit 20a has a highly accurate image analysis program installed therein and is capable of detecting features of a product from the photographed image 50 and identifying defects in the product.

Normally, the image inspection system 1a uses RAW image in performing inspection processing and reduces the image data amount based on the state of the reception buffer without affecting the inspection processing. Accordingly, even in a state in which the remaining capacity of the reception buffer is low, image data is transmitted reliably to the image inspection system without being discarded whereby decrease in the detection rate of product defects due to lack of images can be avoided.

The image inspection system 1a according to the present example embodiment monitors the state of congestion in the transmission path on a real-time basis by using the ACK packet that is exchanged between the image photographing unit (camera) 10a and the image inspection unit (host) 20 and changes the degree of reduction of the color information and the number of colors reduced in accordance with the state of congestion in the transmission path. Accordingly, it is possible to avoid lack of inspection images due to the overflow in the reception buffer on the host side and the problem of decrease in the detection rate of the defective products by the image inspection system is resolved. Note that the image inspection system 1a according to the present example embodiment is an example of the communication control system 1 according to the first example embodiment.

Figure 4:
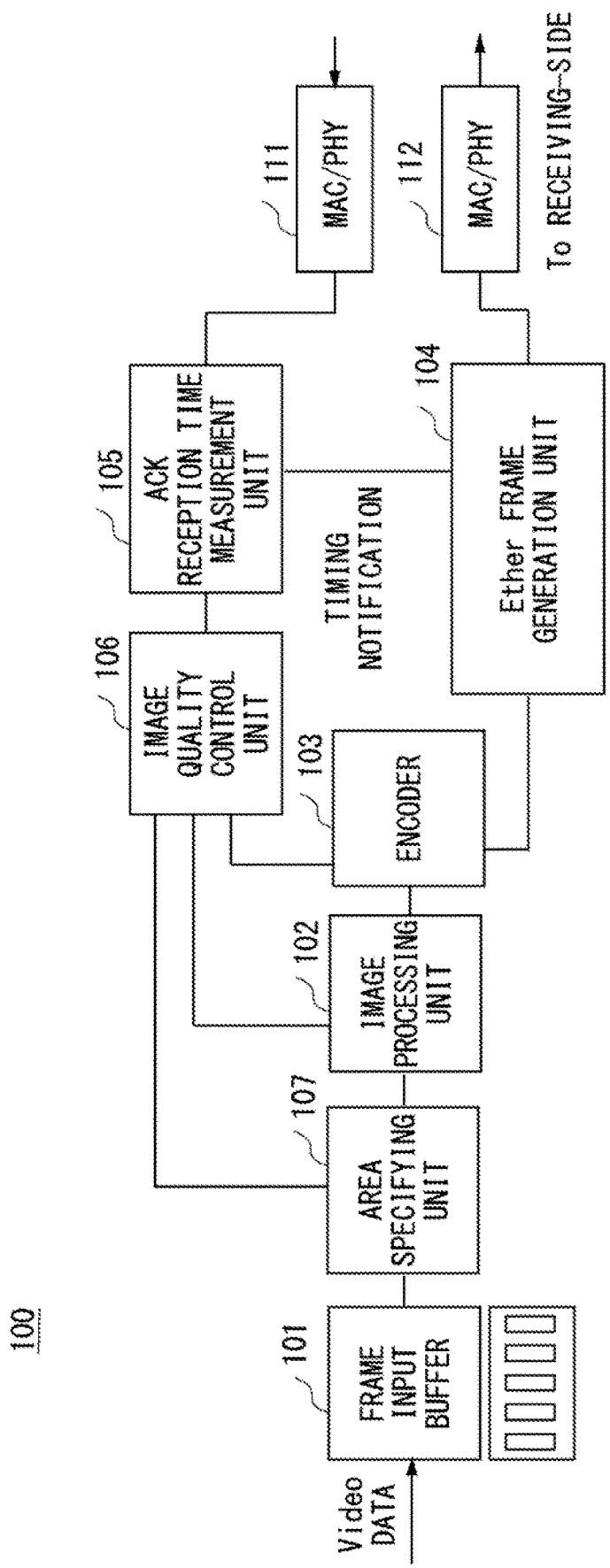
FIG. 4 is a block diagram showing a configuration of a transmitting-side communication device according to the second example embodiment.

FIG. 4 is a block diagram showing a configuration of a transmitting-side communication device according to the second example embodiment.

A transmitting-side communication device 100 indicates functional blocks in the aforementioned image photographing unit 10a. The transmitting-side communication device 100 can be realized, for example, by an information processing device including a processor such as a CPU (Central Processing Unit) and a memory. As shown in FIG. 4, the transmitting-side communication device 100 includes a frame input buffer 101, an area specifying unit 107, an image processing unit 102, an encoder 103, an Ether frame generation unit 104, an ACK reception time measurement unit 105, an image quality control unit 106, MAC/PHY 111, and MAC/PHY 112. Note that the MAC/PHY 111 and the MAC/PHY 112 of the transmitting-side communication device 100 are connected to MAC/PHY 211 and MAC/PHY 212 of a receiving-side communication device, respectively, through a link such as the Ethernet (registered trademark).

The frame input buffer 101 is a buffer that temporarily stores image frames received from a camera such as a video camera. The area specifying unit 107 receives an image frame from the frame input buffer 101 and verifies the area within the image frame that may be necessary for performing the following image inspection processing, whereby it is able to specify such an area. Further, the area specifying unit 107 has an image analysis program that is less accurate than that of the image inspection unit 20a installed therein, and is able to verify the area in the image frame that is necessary for performing image inspection and the area in the image frame that is not necessary for performing image inspection by receiving a control signal from the image quality control unit 106. The area specifying unit 107 has an image analysis program that employs an inference AI (artificial intelligence) such deep learning. The area specifying unit 107 is able to extract one or a plurality of feature parts (e.g. feature parts A, B, C) that may be necessary for performing inspection. The area specifying unit 107 transmits, to the image processing unit 102, an image in which the area necessary for performing image inspection and the area not necessary for performing image inspection are discriminated. When the feature parts A, B, and C are prioritized in the stated order, the area specifying unit 107 may selectively specify the feature part having the higher priority as the remaining capacity of the reception buffer decreases.

The image processing unit 102 receives a control signal from the image quality control unit 106 whereby it is able to perform various image processing, such as trimming the areas of the frame that are not necessary for performing inspection and performing color reduction processing, on a frame transmitted from the area specifying unit 107 in which the area necessary for performing inspection is specified. The control signal from the image quality control unit 106 is, for example, a control signal based on the remaining capacity of the reception buffer (details to follow).

The encoder 103 receives the control signal from the image quality control unit 106 and perform encoding at an appropriate compression rate on the data for which color reduction processing or cut-out processing has been performed. The control signal from the image quality control unit 106 is a control signal based on the remaining capacity of the reception buffer (details to follow). Note that a specific example of the modification unit 13 of the first example embodiment may be the image processing unit 102 or the encoder 103.

The Ether frame generation unit 104 generates Ether frames from the frames for which various image processing such as the color reduction processing, the cut-out processing, and the encoding have been performed and transmits them to a receiving-side communication device 200 through the MAC/PHY 112. Further, when the Ether frames are transmitted, the Ether frame generation unit 104 notifies the ACK reception time measurement unit 105 of the time of transmission of each of the Ether frames.

Normally, an image inspection system including the transmitting-side communication device 100 and the receiving-side communication device 200 uses RAW images as evidence for image inspection in order to detect minor defects in the product to be inspected and stores the RAW images. For this reason, the image processing unit 102 and the encoder 103 of the transmitting-side communication device 100 shown in FIG. 4 do not perform image compression operation and transmit the RAW images to the Ether frame generation unit 104 and further to the host (the receiving-side communication device 200).

Figure 5:
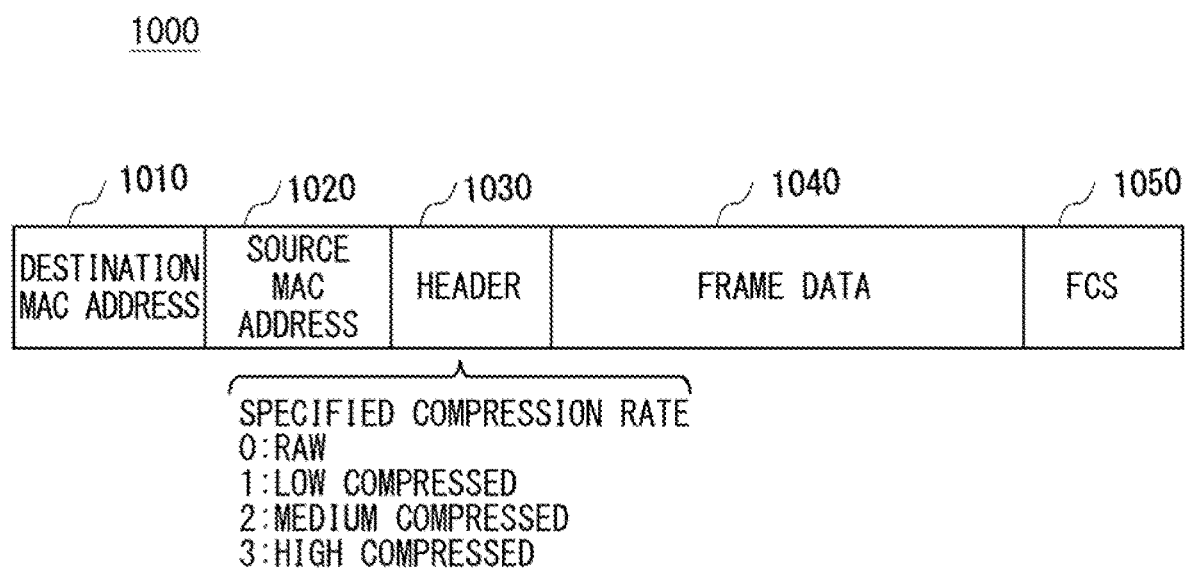
FIG. 5 is a diagram showing an example of a format of a transmission packet frame.

FIG. 5 shows an example of a format of a transmission packet frame. A transmission packet frame 1000 includes a destination MAC address 1010, a source MAC address 1020, a header 1030, frame data 1040, and an FCS (Frame Check Sequence) 1050. In this case, the transmission packet frame 1000 has a code (e.g. 0) indicating the compression rate embedded in its header 1030 by the Ether frame generation unit 104. Note that FCS is an error detecting code added to the data at the time of data transmission for checking data errors in the process of data transmission. Note that in FIG. 5, compression rates are indicated as RAW (indicating uncompressed state), low compressed, medium compressed, or high compressed but the compression rates are not limited thereto. The compression rates may be set in more detail.

Figure 6:
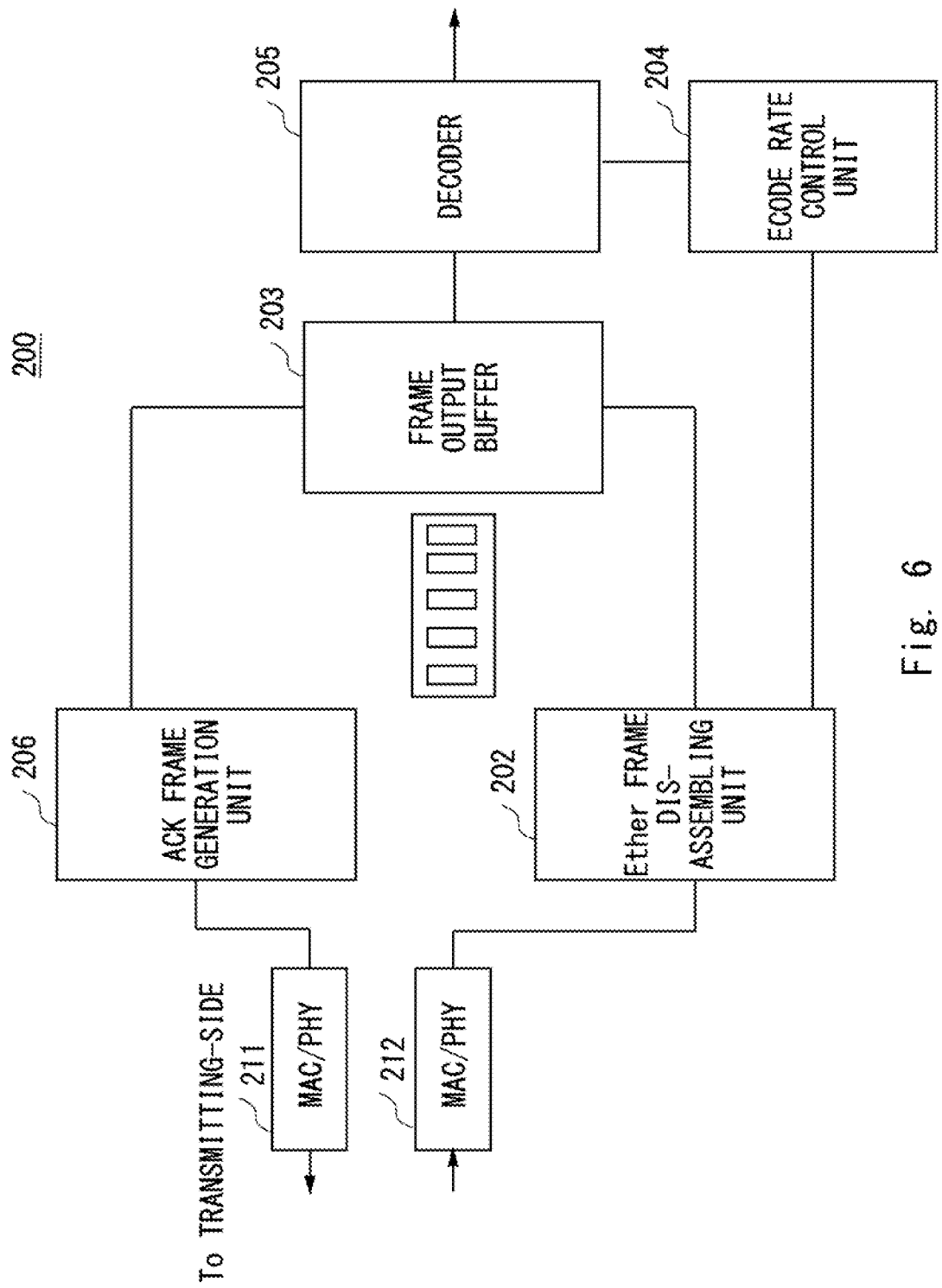
FIG. 6 is a block diagram showing a configuration of a receiving-side communication device according the second example embodiment.

FIG. 6 is a block diagram showing a configuration of a receiving-side communication device according the second example embodiment.

The receiving-side communication device 200 is one of the functional blocks in the image inspection unit 20*a*. The receiving-side communication device 200 can be realized, for example, by an information processing device including a processor such as a CPU (Central Processing Unit) and a memory. The aforementioned image processing device may perform image inspection or the like. The receiving-side communication device 200 includes an Ether frame disassembling unit 202, a frame output buffer 203, a decode rate control unit 204, a decoder 205, and an ACK frame generation unit 206.

In the receiving-side communication device 200 shown in FIG. 6, the Ether frame disassembling unit 202 of the receiving-side communication device 200 receives frames from the transmitting-side communication device 100 through the MAC/PHY 212. The Ether frame disassembling unit 202 interprets the contents of the packet it has received. Further, the decode rate control unit 204 determines the decode rate of the packet. Since the compression rate of the received packet is now 0, the decode rate control unit 204 performs uncompressed setting on the decoder 205 so that the decoder 205 processes the data received from the frame output buffer 203 (also referred to as the reception buffer in the present application) without performing a decoding operation on the data. The ACK frame generation unit 206 generates an ACK frame corresponding to the received frame at a timing based on the usage rate of the frame output buffer 203 and transmits it to the transmitting-side communication device 100 through the MAC/PHY 211 as a reply to the received frame.

An example of the timing for transmitting the ACK frame as a reply based on the remaining capacity (or the usage rate) of the frame output buffer 203 is that, when the remaining capacity of the frame output buffer is below a threshold value (or the usage rate is equal to or greater than a threshold value), the timing for transmitting the ACK frame as a reply may be delayed. To be more specific, the timing of reply may be delayed stepwise based on the usage rate (e.g. 95%, 90, 85, 80 . . . 0%) of the reception buffer (in FIG. 7, the transmission delay time (ms) can be set so that $T_1 > T_2 > T_3 > T_4 > T_5 > \ldots > T_n$. Note that the transmission delay time in this context is a delay time from the time the ACK frame is generated by the ACK frame generation unit 206 to the time it is transmitted, taking into account the usage rate of the reception buffer.

Figure 8:
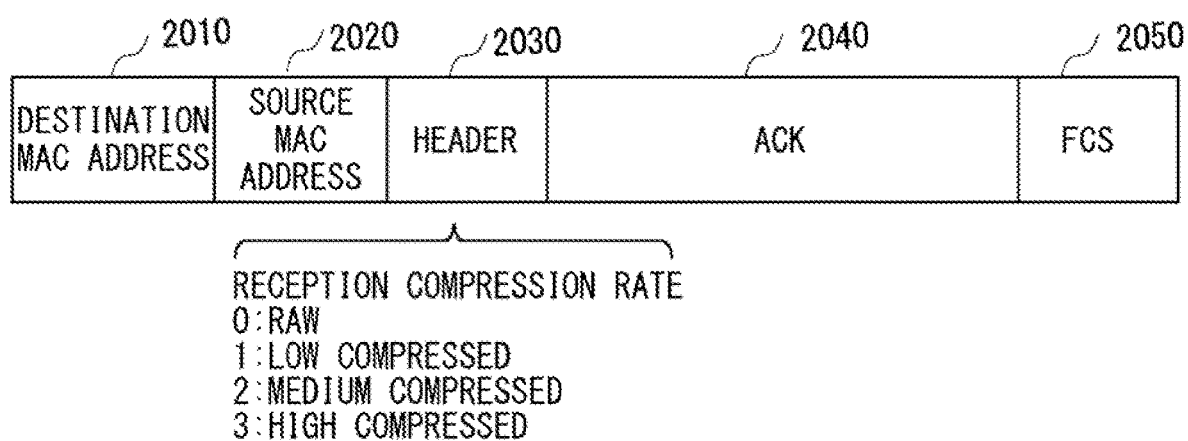
FIG. 8 is a diagram showing an example of a format of a reception packet frame.

FIG. 8 shows an example of an ACK frame 2000. The ACK frame 2000 includes a destination MAC address 2010, a source MAC address 2020, a header 2030, an ACK 2040, and an FCS 2050. The ACK frame 2000 has a code (0) indicating the compression rate of the received data embedded in its header 2030 by the ACK frame generation unit 206.

Referring again to FIG. 4, description of the transmitting-side communication device 100 will be continued.

The transmitting-side communication device 100 sequentially receives ACK packets from the receiving-side communication device 200.

In the transmitting-side communication device 100, the ACK reception time measurement unit 105 compares the time of transmission of the image frame data indicated in a timing notification sent from the Ether frame generation unit 104 and the time of receipt (time of arrival) of the ACK packet and calculates the time lag between the time of transmission of the image frame data and the time of receipt of the ACK packet as the ACK reception time. The ACK reception time measurement unit 105 estimates the vacancy state of the frame output buffer 203 (also referred to the reception buffer) of the receiving-side communication device 200 based on the calculated reception time. That is, the ACK reception time measurement unit 105 can estimate that the shorter the ACK reception time, the larger the free capacity in the reception buffer whereas the longer the ACK reception time, the smaller the free capacity (the remaining capacity) in the reception buffer. The ACK reception time measurement unit 105 provides the result of estimation about the free capacity in the reception buffer to the image quality control unit 106.

The image quality control unit 106 generates control signals for controlling the area specifying unit 107, the image processing unit 102, and the encoder 103 based on the estimated free capacity in the reception buffer. Specifically, the image quality control unit 106 decides the area specifying method for the area specifying unit 107 based on the free capacity in the reception buffer estimated from the reception time. The area specifying unit 107 has an inference AI. In general, in order to perform inference, a function called network needs to be generated based on a large number of training data. Since a large number of operations needs to be performed on the training data with high accuracy (i.e. no mistakes as a trainer) in order to generate a network with satisfactory accuracy, training is performed by the host (the image inspection unit 20*a*) having large resources and the network generated by this training operation is fed back to an edge (the area specifying unit 107 of the transmitting-side communication device 100 included in the image photographing unit 10*a*). As described above, the image inspection system is intended to form a feedback loop of collecting highly accurate training data and training with the more accurate training data.

Further, the image quality control unit 106 decides on the implementation of the cut-out processing and the color reduction processing (clustering) by the image processing unit 102 and the compression rate of the encoder 103 based on the free capacity in the reception buffer estimated from the reception time. For the areas that are determined, by the area specifying unit 107, to be necessary for performing inspection, the image quality control unit 106 selects that no cut-out processing and no color clustering are performed for the image processing unit 102. Further, for the areas that are determined, by the area specifying unit 107, to be necessary for performing inspection, the image quality control unit 106 selects that no data compression is performed for the encoder 103. When the estimated free capacity in the reception buffer is sufficient, the image quality control unit 106 also selects that no cut-out processing and no color clustering are performed for the image processing unit 102 for the areas other than the areas that are determined, by the area specifying unit 107, to be necessary for performing inspection. Further, when the estimated free capacity in the reception buffer is sufficient, the image quality control unit 106 also selects that no data compression is performed for the encoder 103 for the areas other than the areas that are determined, by the area specifying unit 107, to be necessary for performing inspection.

Next, assume that congestion is occurring in the transmission path. Under a state in which the congestion is occurring in the transmission path, the free capacity in the frame output buffer 203 may be insufficient. The ACK frame generation unit 206 that has detected such a state transmits an ACK packet after waiting for a certain period of time. For example, as described above with reference to FIG. 7, the timing of reply may be delayed stepwise based on the usage rate (e.g. 95%, 90, 85, 80 . . . 0%) of the reception buffer. The ACK reception time measurement unit 105 receives the ACK packet and measures the ACK reception time from the time lag between the time of transmission of the image frame and the time of receipt of the ACK packet. Accordingly, the ACK reception time measurement unit 105 estimates the degree of occupancy of the reception buffer from the reception time and notifies the image quality control unit 106 of the estimated free capacity in the buffer. In general, the more color information there is, the higher the defect detection rate of the image inspection processing which is performed based on this color information, which can also be useful as evidence. Therefore, it is preferable for the transmitting-side communication device 100 to transmit RAW data to the receiving-side communication device 200 wherever possible. However, when the image quality control unit 106 is notified that the transmission path is congested, it performs control on the area specifying unit 107, the image processing unit 102, and the encoder 103 based on the estimated usage rate of the reception buffer for the areas other than the areas that are determined, by the area specifying unit 107, to be necessary for performing inspection.

The image quality control unit 106 performs setting on the image processing unit 102 so that it performs color reduction processing by color clustering to prevent overflow in the reception buffer. The image quality control unit 106 can perform setting on the image processing unit 102 so that it can reduce the size of an image to a size that the frame output buffer 203 can receive, for example, by reducing colors from full color to three colors or single color, or the like. The image processing unit 102 performs color reduction processing based on an instruction from the image quality control unit 106.

Figure 9:
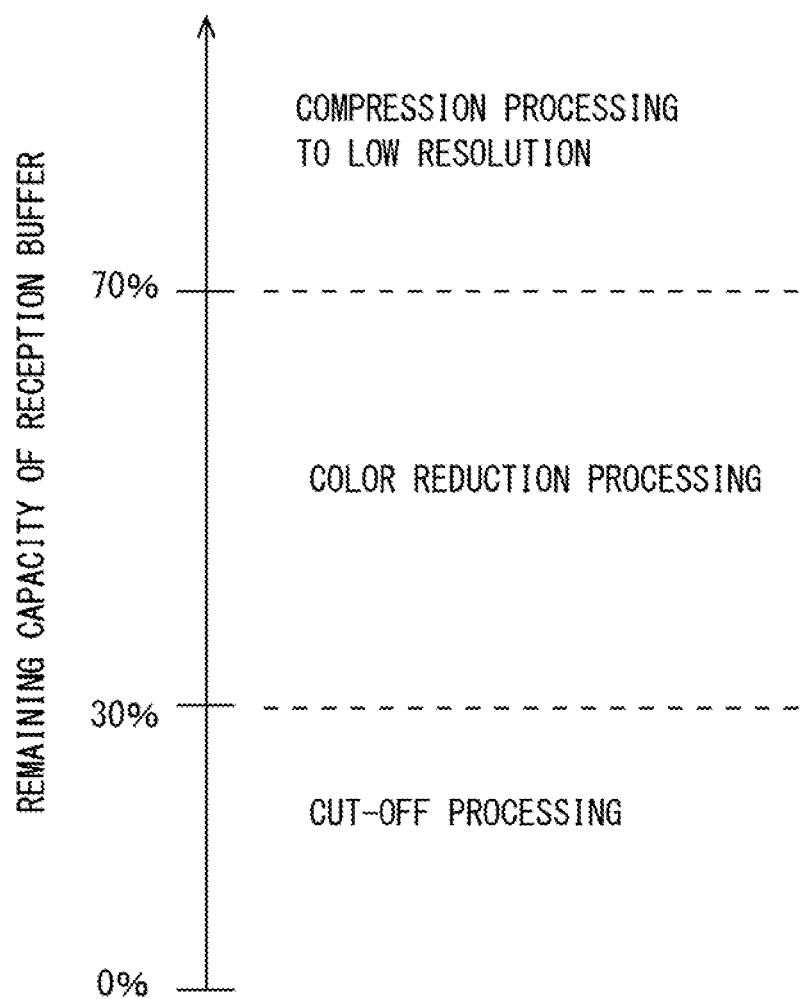
FIG. 9 is a diagram showing examples of image processing performed based on the remaining capacity of the reception buffer.

FIG. 9 is a diagram showing examples of image processing performed based on the remaining capacity of the reception buffer. The image quality control unit 106 performs control on the image processing unit 102 or the encoder 103 so that different image processing described below is performed, in accordance with the remaining capacity of the reception buffer, on an area of the image that is verified by the area specifying unit 107 to be not necessary for performing inspection. For example, when the remaining capacity of the reception buffer is equal to or lower than the threshold value (30% in FIG. 9), processing can be performed so as to cut off the unnecessary area. Further, when the remaining capacity of the reception buffer is below the threshold value (70% in FIG. 9) or exceeds the threshold value (30% in FIG. 9), color reduction processing of filling with one color may be performed on the unnecessary area. Further, when the remaining capacity of the reception buffer is equal to or greater than the threshold value (70% in FIG. 9), compression processing is performed at an appropriate compression rate so that the unnecessary regions are compressed to a low resolution. Note that the threshold values and the image processings shown in FIG. 9 are mere examples and the present disclosure is not limited thereto. Further, image processing is not performed on the area which is not necessary in performing inspection and such area of the data remains uncompressed.

Further, the image quality control unit 106 decides the appropriate compression rate for the encoder 103. FIG. 10 is a table showing estimated compression rates based on the estimated remaining capacity of the reception buffer. The compression rate is set so as to become higher as the remaining capacity of the reception buffer decreases (i.e. the usage rate increases) (a<b<c<d<e . . . ). Further, the image quality control unit 106 may be set so as not to perform compression of the image frame when the remaining capacity in the reception buffer is equal to or greater than a threshold value (e.g. 90%), that is, when there is sufficient free capacity in the reception buffer. When the estimated remaining capacity of the reception buffer is equal to or greater than a threshold value (the usage rate of the reception buffer is below the threshold value) at the initial stage of image frame transmission by the transmitting-side communication device 100, the image quality control unit 106 can decide that the data in the unnecessary area is the uncompressed image data (RAW data). Note that as shown in FIGS. 5 and 8, examples of the compression rate set by the image quality unit 106 may include four stages of compression rates indicated as uncompressed (RAW data), low compression, medium compression, and high compression but the rates is not limited thereto.

The encoder 103 compresses the image data to an appropriate size using irreversible or reversible techniques. In this case, the transmission packet frame 1000 has a code (e.g. 1, 2 or 3) indicating the set compression rate embedded in its header 1030 by the Ether frame generation unit 104.

The area specifying unit 107 detects, for example, the areas A, B, and C within the image which are necessary for performing inspection and when the order of priority of the areas is A>B>C, it may verify that the area A is the only area necessary for performing inspection in the case where the remaining capacity of the reception buffer is low, that the areas A and B are the areas necessary for performing inspection in the case where the remaining capacity of the reception buffer is medium, and that the areas A, B, and C are the areas necessary for inspection in the case where the remaining capacity of the reception buffer is high (the reception buffer has sufficient remaining capacity).

Note that in the image inspection system according to the present example embodiment, it is assumed that area in the data necessary for performing image inspection does not have the pixels compressed, and from the viewpoint of the training data, it can be regarded as clean (highly accurate) data without any distortion in the area necessary for performing training. By employing this configuration, it is possible generate a highly accurate network, and by forming a positive feedback loop like the one described above, it is possible to realize a mechanism in which the performance of the system can be updated while the system is being operated. For example, when incorrect skewed data including errors gets mixed in in the correct data during the training, the accuracy of the network which has been trained using the incorrect data decreases. By creating, taking into consideration the state of the buffer, a loop of re-learning with the correct data without causing a buffer overflow and data corruption, the aforementioned problem can be resolved.

As described above, the image inspection system according to the present example embodiment is capable of suppressing an overflow in the reception buffer and transmitting a photographed image even when congestion is occurring in the transmission path due to stagnation in the processing on the host (the receiving-side communication device) side and the like. By this configuration, it is possible to prevent decrease in the detection rate of the defective products due to lack of images. Note that the rate of detection of defective products in the reduced color images or the compressed images is assumed to be equal to or lower than the rate of detection of defective products in RAW images, but still, at least all of the products can be inspected. Further, the image inspection system described above is advantageous compared to conventional image inspection systems on the point that the user can assume, from the image size, the timing at which a defective product is mixed in with non-defective products A first effect is that rate of detection of defective products in an image inspection system is improved. The reason therefor is that it is possible to perform inspection through sequential images by transmitting, to the inspection device, image data necessary for performing inspection at the inspection side without causing overflow in the image reception buffer.

A second effect is that reliability of detection, by the image inspection system, of the defective products is improved. The reason therefor is that in a conventional system, if one out of 100 images is missing, it cannot be identified which target of inspection was photographed in the missing image and further, it is unknown whether the remaining 99 images are associated with the product and so the reliability of the inspection of other products is also low. By realizing image inspection using all images without causing overflow in the reception buffer, it is possible to have the target of inspection and all of the images to correspond to each other and the reliable inspection as regards good/poor of the product can be achieved.

In the example described above, the program can be stored by using any of various types of non-transitory computer-readable media and supplied to a computer. Examples of non-transitory computer-readable media include various types of tangible storage media. Examples of non-transitory computer-readable media include magnetic storage media (e.g. flexible disks, magnetic tapes, and hard disk drives), magneto-optical storage media (e.g., magneto-optical disks), CD-ROM (Read Only Memory), CD-R, and CD-R/W, DVD (Digital Versatile Disc), BD (Blu-ray (registered trademark) Disc), and semiconductor memory (e.g. mask ROM, PROM (Programmable ROM), EPROM (Erasable PROM, flash ROM, and RAM (Random Access Memory). Further, the program may also be supplied to a computer through any of various types of transitory computer-readable media. Examples of the transitory computer-readable media include electrical signals, optical signals, and electromagnetic waves. The transitory computer-readable media can supply the program to a computer via a wired communication path, such as an electric wire and an optical fiber, or a wireless communication path.

Note that the present disclosure is not limited to the aforementioned example embodiments and can be modified as appropriate without departing from the gist of the present disclosure.

Although the present disclosure has been described with reference to the example embodiments, the present disclosure is not limited to the above. Various changes that can be understood by those skilled in the art can be made to the configuration and details of the present disclosure within the scope of the present invention.

This application is based upon and claims the benefit of priority from Japanese patent application No. 2020-100139, filed on Jun. 9, 2020, the entire contents of which are incorporated herein by reference.

Some or all of the above example embodiments may also be described as in the following Supplementary Notes, but are not limited to the following.

Supplementary Note 1

A communication control system comprising:
a first communication device; and
a second communication device, wherein
image frame data is transmitted from the first communication device to the second communication device,
the second communication device includes:
  a reception buffer for receiving the image frame data from the first communication device; and
  a reply unit configured to transmit an ACK frame to the first communication device at a timing when remaining capacity of the reception buffer of the second communication device is reflected,
the first communication device includes:
  an estimation unit configured to receive the ACK frame from the reply means of the second communication device and estimate the remaining capacity of the reception buffer of the second communication device based on a reception time of the ACK frame;
  an area specifying unit configured to specify an area in the image frame which is necessary for performing image inspection;
  a modification unit configured to perform, based on the estimated remaining capacity of the reception buffer, image compression for the areas in the image frame other than the area in the image frame necessary for performing image inspection; and
  a transmission unit configured to transmit image frame data from the first communication device to the second communication device.

Supplementary Note 2

The communication control system described in Supplementary Note 1, wherein the modification unit is configured to perform cut-off processing for areas in the image frame other than the areas necessary for performing inspection when the estimated remaining capacity of the reception buffer is equal to or lower than the threshold value.

Supplementary Note 3

The communication control system described in Supplementary Note 1 or 2, wherein the reply unit is configured to transmit an ACK frame as a reply at a timing that is delayed stepwise as the remaining capacity of the reception buffer decreases.

Supplementary Note 4

The communication control system described in any one of Supplementary Notes 1 to 3, wherein the modification unit is configured to perform image compression of the image frame for the areas in the image frame other than the areas necessary for performing image inspection in such a way that a compression rate becomes higher as the estimated remaining capacity of the reception buffer decreases.

Supplementary Note 5

The communication control system described in any one of Supplementary Notes 1 to 4, wherein the modification unit does not perform image compression of the image frame for the areas in the image frame other than the areas necessary for performing image inspection when the estimated remaining capacity of the reception buffer exceeds a threshold value.

Supplementary Note 6

The communication control system described in any one of Supplementary Notes 1 to 5, wherein the modification unit does not perform image compression of the image frame for the areas in the image frame necessary for performing image inspection.

Supplementary Note 7

The communication control system described in any one of Supplementary Notes 1 to 6, wherein the modification unit sets the image frame data to uncompressed image data for the areas in the image frame other than the areas necessary for performing image inspection when the estimated remaining capacity of the reception buffer exceeds a threshold value.

Supplementary Note 8

The communication control system described in any one of Supplementary Notes 1 to 7, wherein the estimation unit compares the time of transmission of the image frame data transmitted from the transmission unit and the time of reception of the ACK frame transmitted as a reply to the image frame data and calculates the reception time of the ACK frame, and estimates the remaining capacity of the reception buffer based on the calculated reception time of the ACK frame.

Supplementary Note 9

A communication control method for transmitting image frame data from a first communication device to a second communication device, comprising:
  performing, in the second communication device,
    reception of image frame data from the first communication device, and
    transmission of an ACK frame to the first communication device at a timing when remaining capacity of the reception buffer of the second communication device is reflected;
  performing, in the first communication device,
    reception of the ACK frame from the second communication device and estimation of the remaining capacity of the reception buffer of the second communication device based on a reception time of the ACK frame,
    specification of an area in the image frame which is necessary for performing image inspection,
    image compression based on the estimated remaining capacity of the reception buffer for the areas in the image frame other than the area in the image frame necessary for performing inspection, and
    transmission of image frame data from the first communication device to the second communication device.

REFERENCE SIGNS LIST

1 COMMUNICATION CONTROL SYSTEM
1a IMAGE INSPECTION SYSTEM
10 FIRST COMMUNICATION DEVICE
10a IMAGE PHOTOGRAPHING UNIT
11 ESTIMATION UNIT
12 AREA SPECIFYING UNIT
13 MODIFICATION UNIT
14 TRANSMISSION UNIT
20 SECOND COMMUNICATION DEVICE
20a IMAGE INSPECTION UNIT
21 REPLY UNIT
22 RECEPTION BUFFER
30 IMAGE STORAGE
50 IMAGE
70 CONVEYING DEVICE
100 TRANSMITTING-SIDE COMMUNICATION DEVICE
101 FRAME INPUT BUFFER
102 IMAGE PROCESSING UNIT
103 ENCODER
104 ETHER FRAME GENERATION UNIT
105 ACK RECEPTION TIME MEASUREMENT UNIT
106 IMAGE QUALITY CONTROL UNIT
107 AREA SPECIFYING UNIT
111 MAC/PHY
112 MAC/PHY
200 RECEIVING-SIDE COMMUNICATION DEVICE
202 ETHER FRAME DISASSEMBLING UNIT
203 FRAME OUTPUT BUFFER
204 DECODE RATE CONTROL UNIT
205 DECODER
206 ACK FRAME GENERATION UNIT
211 MAC/PHY
212 MAC/PHY
1000 TRANSMISSION PACKET FRAME
2000 RECEPTION PACKET FRAME

What is claimed is:

1. A communication control system comprising:
  a first communication device; and
  a second communication device, wherein
    image frame data is transmitted from the first communication device to the second communication device,
    the second communication device includes:
      a memory storing instructions, and
      a processor configured to execute the instructions to, for each of a plurality of times:
        receive the image frame data from the first communication device in a reception buffer; and
        transmit an ACK frame to the first communication device at a timing that reflects remaining capacity of the reception buffer of the second communication device, wherein the timing at which the ACK frame is transmitted is delayed in a stepwise manner as the remaining capacity of the reception buffer decreases,
    the first communication device includes:
      a memory storing instructions, and
      a processor configured to execute the instructions to, for each time:
        transmit the image frame data to the second communication device;
        receive the ACK frame from the second communication device and estimate the remaining capacity of the reception buffer of the second communication device based on a reception time of the ACK frame;
        specify an area in the image frame which is necessary for performing image inspection; and
        perform, based on the estimated remaining capacity of the reception buffer, image compression for areas in the image frame other than the area in the image frame necessary for performing image inspection.

2. The communication control system according to claim 1, wherein the processor of the first communication device is configured to perform cut-off processing for the areas in the image frame other than the area necessary for performing inspection when the estimated remaining capacity of the reception buffer is equal to or lower than a threshold value.

3. The communication control system according to claim 1, wherein the processor of the first communication device is configured to perform image compression of the image frame for the areas in the image frame other than the area necessary for performing image inspection in such a way that a compression rate increases as the estimated remaining capacity of the reception buffer decreases.

4. The communication control system according to claim 1, wherein the processor of the first communication device is configured to forgo performing image compression of the image frame for the areas in the image frame other than the area necessary for performing image inspection when the estimated remaining capacity of the reception buffer exceeds a threshold value.

5. The communication control system according to claim 1, wherein the processor of the first communication device is configured to forgo performing image compression of the image frame for the areas in the image frame necessary for performing image inspection.

6. The communication control system according to claim 1 wherein the processor of the first communication device is configured to set the image frame data to uncompressed image data for the areas in the image frame other than the area necessary for performing image inspection when the estimated remaining capacity of the reception buffer exceeds a threshold value.

7. The communication control system according to claim 1, wherein the processor of the first communication device is configured to compare a time of transmission of the image frame data and a time of reception of the ACK frame transmitted as a reply to the image frame data and calculate the reception time of the ACK frame, and estimate the remaining capacity of the reception buffer based on the calculated reception time of the ACK frame.

8. The communication control system according to claim 1, wherein the processor of the first communication device is configured to change a compression rate for image compression according to a delay of the timing at which the ACK frame is transmitted.

9. A communication control method for transmitting image frame data from a first communication device to a second communication device, the communication control method comprising:
  performing, by the second communication device for each of a plurality of times:
    receiving the image frame data from the first communication device in a reception buffer; and
    transmitting an ACK frame to the first communication device at a timing that reflects remaining capacity of the reception buffer of the second communication device, wherein the timing at which the ACK frame is transmitted is delayed in a stepwise manner as the remaining capacity of the reception buffer decreases,
  performing, by the first communication device for each time:
    transmitting the image frame data to the second communication device;
    receiving the ACK frame from the second communication device and estimate the remaining capacity of the reception buffer of the second communication device based on a reception time of the ACK frame;
    specifying an area in the image frame necessary for performing image inspection; and
    performing, based on the estimated remaining capacity of the reception buffer, image compression for areas in the image frame other than the area in the image frame necessary for performing image inspection.

10. The communication control system according to claim 9, further comprising, by the first communication device for each time, changing a compression rate for image compression according to a delay of the timing at which the ACK frame is transmitted.

* * * * *